(12) United States Patent
Poosapalli et al.

(10) Patent No.: US 12,254,322 B2
(45) Date of Patent: Mar. 18, 2025

(54) VIRTUAL PSEUDO PCIE (VVP) DEVICE NODES FOR FAST RELIABLE OS AND VIRTUAL MEMORY (VM) BOOT

(71) Applicant: Dell Products L.P., Round Rock, TX (US)

(72) Inventors: Karunakar Poosapalli, Telangana (IN); Shekar Babu Suryanarayana, Bangalore (IN); Harish Barigi, Nellore (IN); Alankritha T V, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 18/364,492

(22) Filed: Aug. 3, 2023

(65) Prior Publication Data
US 2025/0045063 A1    Feb. 6, 2025

(51) Int. Cl.
*G06F 9/4401* (2018.01)
*G06F 13/42* (2006.01)

(52) U.S. Cl.
CPC ........ *G06F 9/4406* (2013.01); *G06F 13/4221* (2013.01); *G06F 2213/0026* (2013.01)

(58) Field of Classification Search
CPC ............... G06F 9/4406; G06F 13/4221; G06F 2213/0026
See application file for complete search history.

(56) References Cited

U.S. PATENT DOCUMENTS

| | | | |
|---|---|---|---|
| 10,073,805 B2 * | 9/2018 | Vishwanathan | .... G06F 13/4282 |
| 11,994,940 B2 * | 5/2024 | Liu | ..................... G06F 11/0772 |
| 2022/0179961 A1 * | 6/2022 | Yao | ..................... G06F 13/4221 |

* cited by examiner

*Primary Examiner* — Tammara R Peyton
(74) *Attorney, Agent, or Firm* — Jackson Walker L.L.P.

(57) ABSTRACT

In an information handling system that includes one or more PCIe devices, responsive to enumerating a PCIe device and adding the PCIe device to a configuration space of the platform, a mapping entry is added to a device handler mapping table to associate a device handler for the PCIe device with information for accessing the PCIe device. If the PCIe device fails to enumerate in a boot path, a virtual pseudo PCIe (VPP) node corresponding to the PCIe device may be created and enumerated to enable the boot to complete. Upon subsequently detecting and enumerating the actual, physical PCIe device, the VPP node and the PCIe device may be connected to enable the full functionality of the PCIe device without re-booting the platform.

20 Claims, 3 Drawing Sheets

VIRTUAL PSEUDO PCIE (VVP) DEVICE NODES FOR FAST RELIABLE OS AND VIRTUAL MEMORY (VM) BOOT

TECHNICAL FIELD

The present disclosure pertains to information handling systems and, more particularly, methods for booting information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Acronyms used in the following description include:
ACPI—Advanced Configuration and Power Interface]
BAR—Base Address Register
BIOS—basic input/output system
EFI—Extensible Firmware Interface
I/O—input/output
NVS—Network Virtualization Substrate
OS—Operating System
P2SB—Primary to Sideband Bridge
PCI—Peripheral Component Interconnect
PCIe—PCI express
PHY—Physical layer
PPI—Programmable peripheral interconnect
POST—Power On Self-Test
VGA—Video Graphics Array
VM—virtual machine
VRS—Virtual node Runtime Service
xHCI—Extensible Host Controller Interface Currently, a core BIOS PCI root bridge driver produces instances of a PCI root bridge I/O protocol. This protocol is consumed by a PCI bus driver, produces a child handle for each PCI controller, and installs a device path protocol and a PCI I/O protocol onto each child handle. The PCI driver will consume the PCI I/O protocol and produce an I/O abstraction providing services for the console and boot devices required to boot an EFI-conformant OS.

When a subsequent pre-boot driver is invoked, a locate handle buffer operation may be executed to retrieve the PCI I/O protocol instance corresponding to any particular PCIe device. Currently, the core BIOS includes many pre-boot drivers, thus resulting in many locate handle buffer operations being performed by many pre boot drivers, causing handle buffer logic to retrieve the device information repeatedly.

In addition, various observed boot failure scenarios thought to be at least partially attributable to inefficient and excessive locate handle buffer requests include the following:

P2SB BAR Request for non-prefetchable 256M space may cause BIOS PCI enumeration to fail, thus resulting in an unintended dependency between boot failure and a system's PCI enumeration configuration requirements.

A system including a Thunderbolt-connected device may fail to perform PCI enumeration following exit from a D3 power state, where D3 is the lowest powered device low-power state. In this scenario, the boot path may not establish a PCIe link and, as a result, PCIe/USB functionality may be lost.

Improper reset timing during power up sequence between internal domains (PCIe and xHCI) may result in PCIe PHY link failure.

Peripheral devices can have multiple devices connected to a single PCI bridge/device function number. After restart, the PCI tree is still shows the even though device is not available.

When a system includes multiple PCI bridges, PCI enumeration and locate device handle may not detect all devices on the PCI-to-PCI bridge, potentially resulting in PCI enumeration issues and issues handling a new PCIe device on the system's motherboard.

If an end user switches or connects a new PCIe device to the motherboard and the pre boot does not support the new device, the system may freeze or hang during boot, e.g., when OEM logo is displayed. In this case, the end user may require a complete BIOS update when is no POST or error code indication.

Detecting the right device in a diagnostics boot path or BIOS update/recovery boot configuration mode may trigger security failures and customer issues.

SUMMARY

The problems described are at least partially addressed by establishing, prior to performing an initial PCI enumeration, virtual pseudo PCI (VPP) device nodes, also referred to herein simply as VPP nodes, corresponding to each physical PCIe device associated with an information handling system. Each VPP node is a hardware-agnostic abstraction of the corresponding physical PCIe device that includes the bus, device, and base function details of the PCIe device. VPP nodes may function as proxies for physical PCIe devices to enable uninterrupted boot sequences in situations where a PCIe device is not enumerated in the first boot path for various reasons. When the PCIe device is subsequently detected, it may be enabled For example, an information handling system may be implemented as a platform that includes a PCI subsystem featuring a predetermined group of PCI resources including one or more PCIe devices connected to one or more PCI busses. In accordance with disclosed subject matter, a VPP node may be created for any one or more of the predetermined group of PCIe devices. Each VPP node may include all slot and device details. The VPP nodes may be created, for example, by system BIOS prior to performing an initial enumeration of the platform's PCI subsystem.

While traditional PCI enumeration may generate one or more PCIe device detection faults, VPP nodes beneficially promote uninterrupted boot sequences. The use of VPP nodes may result in faster OS boot, faster VM boot, and may avoid system hangs and reboots attributable to faulty and/or delayed PCI enumerations. In addition, disclosed VRS features may support faster VM boot and dynamic remediation with re-initialization of physical devices or a system reboot, enabling reconfiguration and re-enumeration of PCIe devices based on VM dynamic needs.

Faster boot times are achieved by eliminating unnecessary execution cycles associated with legacy locate handle buffer requests for each device and hot plug event while ensuring successful boot path enumeration for every peripheral device associated with a particular platform.

At least some embodiments of disclosed subject matter additionally include cross-boot learning to re-enumerate real PCIe devices on top of virtual nodes. A boot learning method for enumerated PCIe device nodes information across boots creates linked device lists for differential PCIe device node information based on differences from a previous boot. In addition, virtual PCI nodes may be created based on learning history for enumeration when the device is connected.

Disclosed VRS creates a differential bandwidth allocation for PCIe space. A memory space is defined for differential PCIe devices across reboots. VRS creates a virtual node and a runtime PCIe allocation space for differential PCIe devices.

Disclosed solutions achieve VM efficiency to reconfigure and re-enumerate any PCIe devices based on VM dynamic needs without system reboot. A callback may be invoked when any PCIe device is detected to enumerate the newly added device and add the new device to PCI configuration space.

Accordingly, in one aspect, a disclosed information handling system including one or more PCIe devices responsive to enumerating a PCIe device and adding the PCIe device to a configuration space of the platform, a mapping entry may be added to a device handler mapping table. The mapping entry associates a device handler for the PCIe device with information for accessing the PCIe device. In some embodiments, the mapping entry maps a cryptographic signature of the device handler to the information for accessing the PCIe device. The device handler mapping table may be made available pre-boot and at runtime to support trusted PCIe runtime re-configuration.

If a PCIe device fails to enumerate in a boot path (e.g., primary/OS boot path, firmware update boot path, diagnostic boot path), a VPP node corresponding to the PCIe device may be created and enumerated to enable the boot to complete. Upon subsequently detecting and enumerating the PCIe device, the VPP node and the PCIe device may be connected to enable the full functionality of the PCIe device without re-booting the platform.

Enumerating the VPP node may include enumerating a base function of the PCIe device to a higher layer driver. The VPP node may include PCIe bus, device, and function details of the PCIe device. The information to access the device may include a device handle, a DID, a VID, and a device path for the PCIe device. In some embodiments, a boot path PCIe device detection failure may be handled based, at least in part, on the boot path such that a handler for a first boot path differs from a handler for a second boot path. As disclosed herein, a platform may be booted without performing locate handle buffer services for each PCIe device.

Information for accessing the device from the device handler mapping table may be retrieved to handle runtime configuration without a reboot. Embodiments may further include features for discovering or otherwise learning of differential devices, i.e., devices not present during a prior boot. Embodiments may respond by creating a linked device list for differential PCIe device node information indicative of a PCIe configuration difference from a previous boot.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
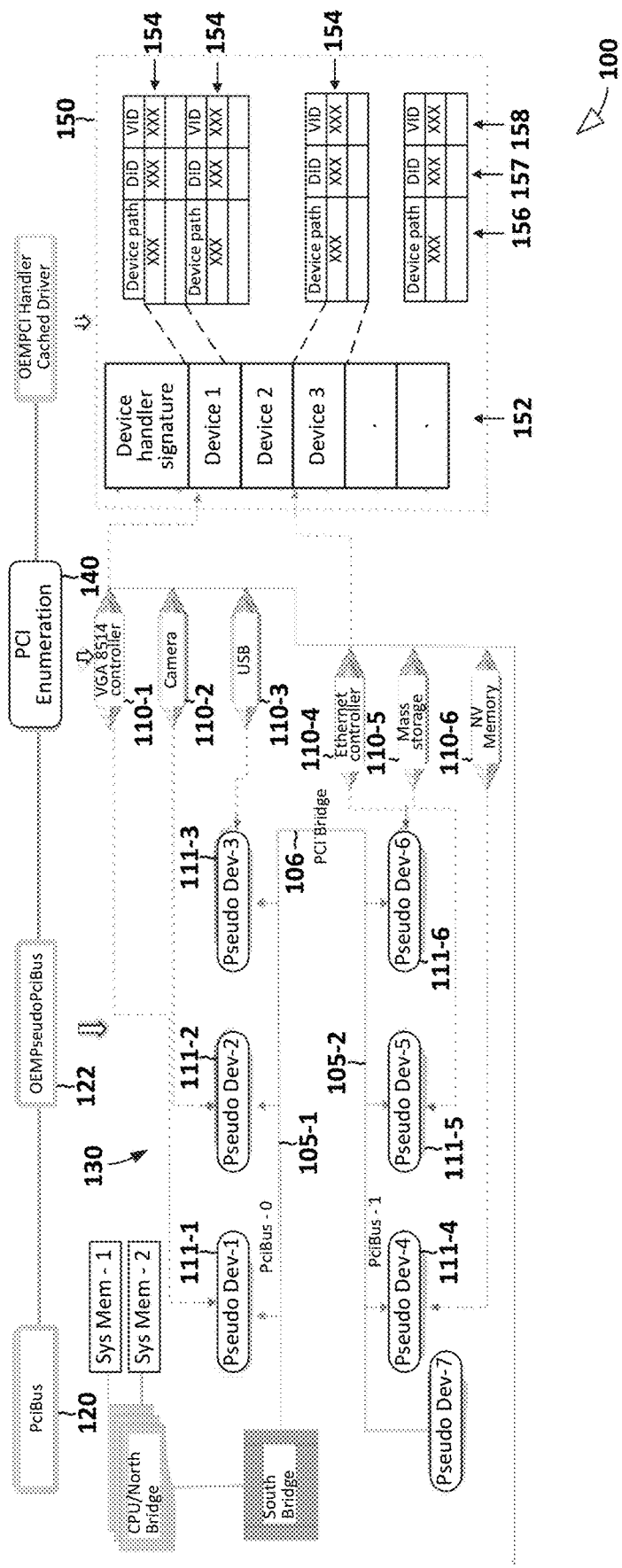
FIG. 1 illustrates the use of virtual pseudo PCIE device nodes for PCIe device handlers in an exemplary information handling system.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Disclosed features include a VPP node method in which a VPP node is created either with or without a corresponding actual PCIe device being physically present. When the actual device is connected, it connects the VPP node and the PCIe device without reboot or additional restart.

Because the BIOS prevents the PCI subsystem from enumerating a P2SB, the P2SB device may be unhidden and hidden back to lookup the P2SB BAR.

Peripheral devices can have multiple devices connected to single PCI bus-device function-number. After a restart, the PCI tree may continue to show the device even when the device is not available and thereby avoids duplication of PCIe devices. The VP PCIe device method may also handle hot plug or runtime device connections or enumerations.

Disclosed features include a handler cached signature for faster enumerations. Whenever any device is enumerated and added to the configuration space, an entry will be added to the device handler mapping table with information including the device handle, a DID, VID, and device path. A memory mapped PCIe device handler list is provided for access at any time with an index based cached signature. The PCIe device database is configured for different device handlers in preboot.

Disclosed features may include a dynamic method to parse and use handler's data for device access. The method may employ a protocol to obtain the device information from a handler's data base. The protocol ma replace legacy locate handler buffer logic and implement a callback method to retrieve the device information from the data base. This solution may implement a PPI/Protocol to extract cached device handlers for any PCIe device access. The parsing method may handle runtime device configurations and hot plug events. The protocol may also implement an interface to handle virtual VPP nodes at preboot and runtime, clock gate the PCIe clock to the xHCI unit reset, and disable P2SB in via Intel Flash Image Tool (FIT) by setting value of a PS2B Enabled register at Board Profiles/Board Specific Configurations/Profile 0/P2SB Enabled to Disabled).

Referring now to the drawings, FIG. 1 depicts an exemplary information handling system platform or, more simply, a platform 100 including a predetermined group of PCIe devices, represented in FIG. 1 by their corresponding PCIe device handlers 110 and a corresponding group of virtual pseudo PCIe device nodes, referred to herein simply as VPP device nodes 111. The exemplary platform 100 depicted in FIG. 1 includes a PCI configuration implementation featuring two PCI buses 105, a PCI bridge 106 connecting PCI buses 105, and PCIe device handlers 110 for six PCIe devices. More specifically, the illustrated PCI configuration includes PCIe device handlers for a VGA/8514 controller 110-1, a camera 110-2, and a USB controller 110-3 connected to a first PCI bus (PCI Bus 0) 105-1. The illustrated PCI configuration further includes PCIe device handlers for an Ethernet controller 110-4, a mass storage device 110-5, and an NV memory device 110-6 connected to a second PCI bus (PCI bus 1) 105-2. Those of ordinary skill in the field of information handling systems will appreciate that the PCI subsystem depicted in FIG. 1 is exemplary and that other implementations of platform 100 may include more, fewer, and/or a different combination of PCI buses, bridges, devices, etc.

As depicted in FIG. 1, a PCI bus driver (PciBus) 120 of platform 100, before performing an initial PCI enumeration via PCI enumeration driver 140, calls or otherwise executes a pseudo PCI bus driver (PseudoPciBus) 122 to create a virtual PCIe device tree 130 including VPP device nodes 111 corresponding to each PCIe device 110 in the predetermined group of PCIe devices of platform 100. In at least one embodiment, each VPP device node 111 is a hardware-agnostic abstraction, in both preboot and runtime, that includes all of the PCIe bus, device, and function details of its corresponding PCIe device 110. When an actual PCIe device 110 is detected, the PCIe device 110 and the corresponding VPP device node 111 are connected without executing reboot, soft or hard reset, or the like. If, as an example, an actual PCIe device 110 was not functional or not physically connected to platform 100 during preboot, the presence of the corresponding VPP device node 111 may enable preboot to complete and, when the applicable physical PCIe device 110 is subsequently detected, it can be connected to VPP device node 111.

In at least some embodiments, a BIOS of platform 100, not explicitly depicted in FIG. 1, implements a feature for hiding P2SB devices to prevent P2SB devices from being enumerated by the PCI subsystem. In such embodiments, each P2SB device may be un-hidden to look up the BAR for the PS2B device, and subsequently re-hidden.

The platform 100 illustrated in FIG. 1 further features a device handler matching table 150 that associates a device handler for a PCIe device with information for accessing the PCIe device. The device handler mapping table 150 depicted in FIG. 1 maps an encrypted signature 152 of the device handler for a PCIe device with a mapping table entry 154 containing information for accessing the PCIe device. The information for accessing the PCIe device depicted in the mapping table entries 154 of FIG. 1 include device path information (156), DID (157), and VID (158), but the illustrated information is exemplary and other implementations may include additional or different device information.

Device handler mapping table 150 may be implemented in system memory or cache in either pre-boot, runtime, or both. The device handler list can be accessed at any time with an index based cached signature.

Figure 2:
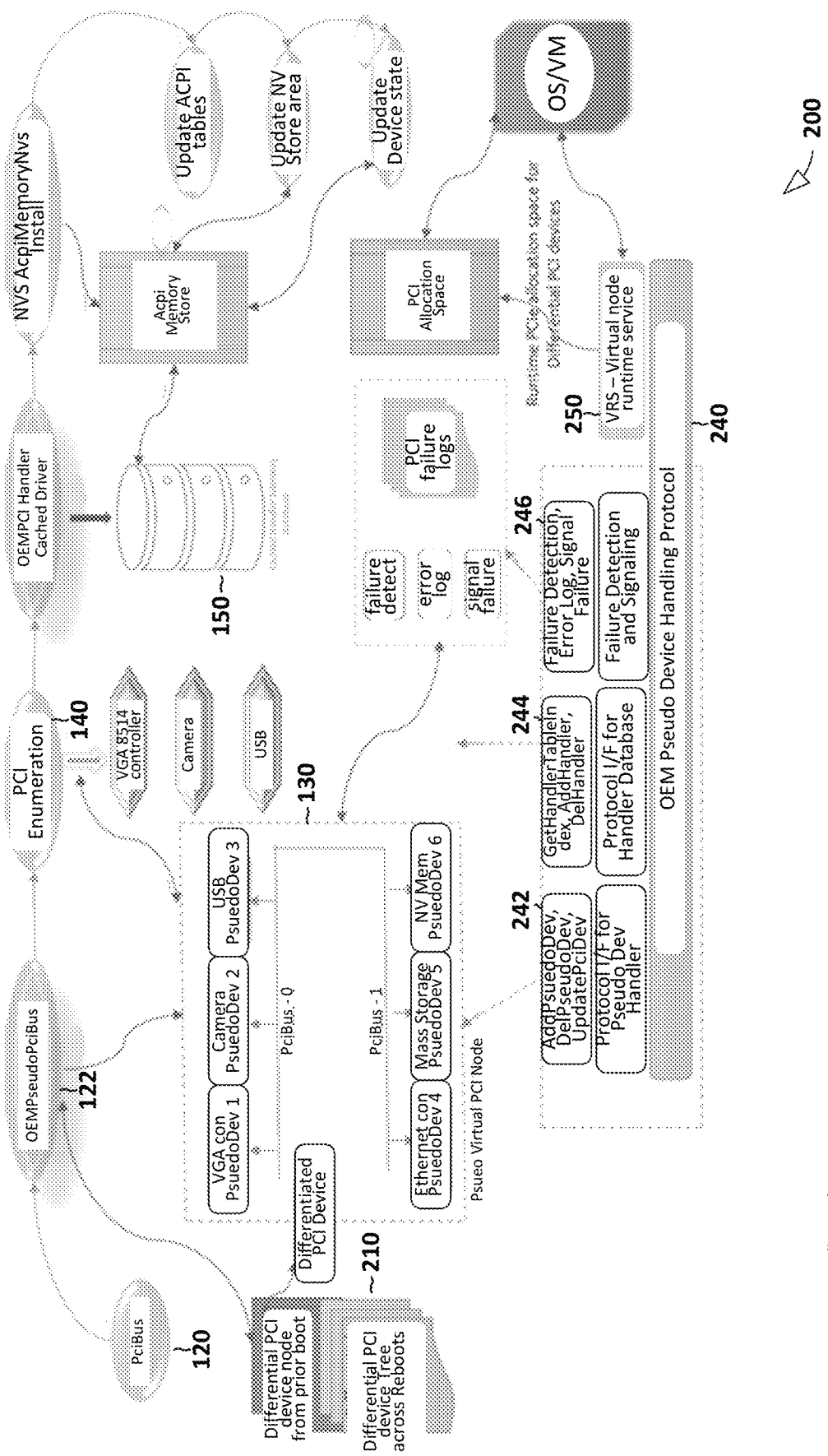
FIG. 2 illustrates additional detail of the information handling system of FIG. 1 includes across-boot learning of differential PCIe devices in conjunction with disclosed VPP nodes.

Referring now to FIG. 2 additional features of an exemplary embodiment of platform 100 are depicted. The platform 100 depicted in FIG. 2 supports learning across boots to re-enumerate real PCIe devices on top of VPP nodes. As depicted in FIG. 2, linked device lists (210) for differential PCI device node information from Previous Boot are determined to create VPP nodes based on learning history and enumerate when the device is connected.

A PPI/Protocol 240 is implemented to parse configuration space and use handler's data for device access. The same runtime protocol can be published and the cached, encrypted signatures (152, FIG. 1) used for runtime device access can handle hot plug events. This interface can be used to handle the virtual pseudo device node at both preboot and runtime and implements a mechanism to handle different PCIe device errors in pre boot and runtime. Error handling methods are provided for any PCIe device detection failures occurring in pre boot, regular boot mode, BIOS update/recovery mode, and diagnostic boot modes.

Disclosed subject matter may be embodied in a platform 100 illustrated in FIG. 2. Salient features of the illustrated platform 100 include a Pseudo Device Handling Protocol 240 implementing a protocol interface 242 for a pseudo device handler, a protocol interface 244 for the handler database, and a failure detecting and signaling module 246. The pseudo device handling protocol 240 may further support a service referred to VRS service 250. In at least some embodiments, VRS 250 creates a differential bandwidth allocation for PCIe space while executing PCIe configuration cycles. VRS 250 may generate a runtime PCIe IO Remap virtual address space during preboot exit services where virtual nodes are mapped to dedicated physical resources like buffering, flow control management, etc., across the hierarchy. VRS 250 may also define a memory space for differential PCIe devices across reboots. VRS 250 may create a VPP node and a runtime allocation space for differential PCIe devices.

Figure 3:
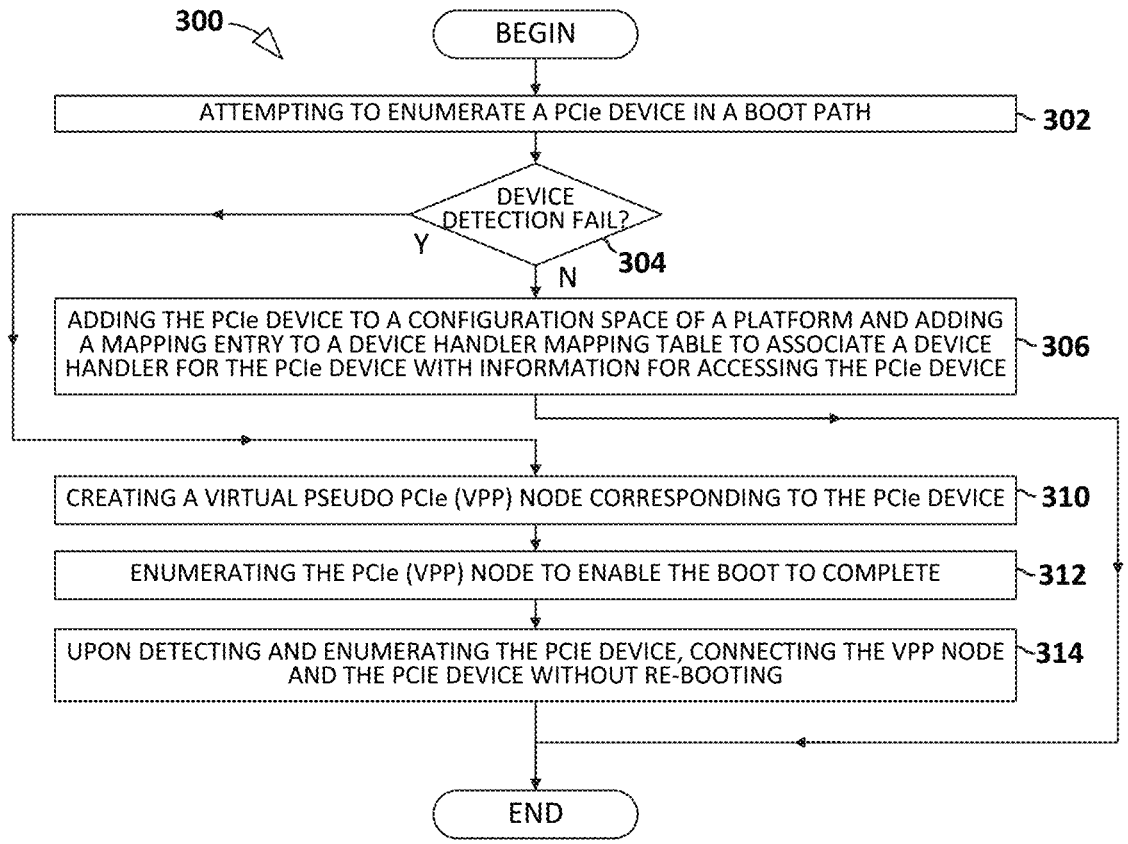
FIG. 3 illustrates a flow diagram of a PCIe configuration method in accordance with disclosed teaching.

Referring now to FIG. 3, a flow diagram illustrates a PCIe configuration method 300 in accordance with disclosed subject matter. The method 300 illustrated in FIG. 3 attempts (operation 302) to enumerate a PCIe device in a boot path. If (operation 304) the PCIe device enumerates successfully, the PCIe device is added (operation 306) to the configuration space of the system and a mapping entry is added to a device handler mapping table to associate a device handler for the PCIe device with information for accessing the PCIe device.

If a device detection failure occurs, the illustrated method 300 branches from operation 304 to operations 310, in which a VPP node is created. The VPP node is then enumerated (operation 312) to enable the boot to complete. Upon subsequently detecting and enumerating the applicable physical PCIe device, the VPP node and the PCIe node are connected (operation 314) without re-booting the system, to enable the full functionality of the PCIe device.

Figure 4:
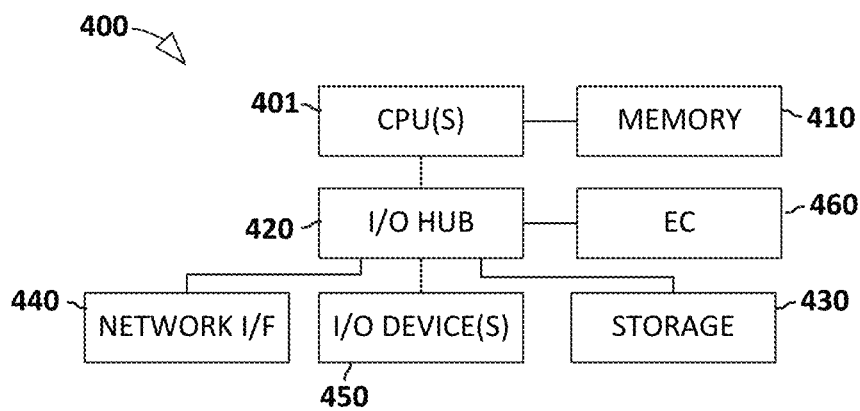
FIG. 4 illustrates an exemplary information handling system suitable for use in conjunction with the systems and methods described in FIGS. 1-3.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes an embedded controller EC 460 may provide or support various system management functions and, in at least some implementations, keyboard controller functions. Exemplary system management function that may be supported by EC 460 include thermal management functions supported by pulse width modulation (PWM) interfaces suitable for controlling system fans, power monitoring functions support by an analog-to-digital (ADC) signal that can be used to monitor voltages and, in conjunction with sense resistor, current consumption per power rail. This information could be used to, among other things, monitor battery charging or inform the user or administrator of potentially problematic power supply conditions. EC 460 may support battery management features to control charging of the battery in addition to switching between the battery and AC adapter as the active power source changes or monitoring the various battery status metrics such as temperature, charge level and overall health. EC 460 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
   a central processing unit (CPU);
   one or more peripheral component interconnect express (PCIe) devices communicatively coupled to the CPU via one or more PCIe busses; and
   non-transitory computer readable media including processor executable instructions that, when executed by a processor, cause the information handling system to perform PCI operations including:
      responsive to enumerating a PCIe device and adding the PCIe device to a configuration space of a platform, adding a mapping entry to a device handler mapping table, wherein the mapping entry associates a device handler for the PCIe device with information for accessing the PCIe device; and
      responsive to a device detection failure for the PCIe device:
         creating a virtual pseudo PCIe (VPP) node corresponding to the PCIe device;
         enumerating the VPP node to enable boot to complete; and
         responsive to subsequently detecting and enumerating the PCIe device, connecting the VPP node and the PCIe device without re-booting the information handling system.

2. The information handling system of claim 1, wherein enumerating the VPP node includes enumerating a base function of the PCIe device to a higher layer driver.

3. The information handling system of claim 1, wherein the VPP node includes PCIe bus, device, and function details of the PCIe device.

4. The information handling system of claim 1, wherein the information to access the device includes a handle, a device identifier (DID), a vendor identifier (VID), and a device path for the PCIe device.

5. The information handling system of claim 1, wherein the mapping entry maps a cryptographic signature of the device handler to the information for accessing the PCIe device.

6. The information handling system of claim 5, wherein the device handler mapping table is available at runtime to support trusted PCIe runtime re-configuration.

7. The information handling system of claim 1, wherein the PCI operations include: handling a boot path PCIe device detection failure based, at least in part, on the boot path, wherein a handler for a first boot path differs from a handler for a second boot path.

8. The information handling system of claim 1, wherein the PCI operations include: booting the platform without performing locate handle buffer services for each PCIe device.

9. The information handling system of claim 1, wherein the PCI operations include: responsive to a runtime configuration of a PCIe device, retrieving the information for accessing the device from the device handler mapping table to handle the runtime configuration with a reboot.

10. The information handling system of claim 1, wherein PCI operations include: creating a linked device list for differential PCIe device node information indicative of a PCIe configuration difference from a previous boot.

11. A peripheral component interconnect express (PCIe) method for performing, in an information handling system comprising a central processing unit (CPU) and one or more PCIe devices communicatively coupled to the CPU via one or more PCIe busses, operations including:
   responsive to enumerating a PCIe device and adding the PCIe device to a configuration space of a platform, adding a mapping entry to a device handler mapping table, wherein the mapping entry associates a device handler for the PCIe device with information for accessing the PCIe device; and
   responsive to a device detection failure for the PCIe device:
      creating a virtual pseudo PCIe (VPP) node corresponding to the PCIe device;
      enumerating the VPP node to enable boot to complete; and
      responsive to subsequently detecting and enumerating the PCIe device, connecting the VPP node and the PCIe device without re-booting the information handling system.

12. The method of claim 11, wherein enumerating the VPP node includes enumerating a base function of the PCIe device to a higher layer driver.

13. The method of claim 11, wherein the VPP node includes PCIe bus, device, and function details of the PCIe device.

14. The method of claim 11, wherein the information to access the device includes a handle, a device identifier (DID), a vendor identifier (VID), and a device path for the PCIe device.

15. The method of claim 11, wherein the mapping entry maps a cryptographic signature of the device handler to the information for accessing the PCIe device.

16. The method of claim 15, wherein the device handler mapping table is available at runtime to support trusted PCIe runtime re-configuration.

17. The method of claim 11, wherein the PCI operations include: handling a boot path PCIe device detection failure based, at least in part, on the boot path, wherein a handler for a first boot path differs from a handler for a second boot path.

18. The method of claim 11, wherein the PCI operations include: booting the platform without performing locate handle buffer services for each PCIe device.

19. The method of claim 11, wherein the PCI operations include: responsive to a runtime configuration of a PCIe device, retrieving the information for accessing the device from the device handler mapping table to handle the runtime configuration with a reboot.

20. The method of claim 11, wherein PCI operations include: creating a linked device list for differential PCIe device node information indicative of a PCIe configuration difference from a previous boot.

* * * * *